(12) United States Patent
Haley et al.

(10) Patent No.: US 10,601,497 B2
(45) Date of Patent: Mar. 24, 2020

(54) TERMINAL SCHEDULING METHOD IN SATELLITE COMMUNICATION SYSTEM

(71) Applicant: Myriota Pty Ltd, Adelaide SA (AU)

(72) Inventors: David Victor Lawrie Haley, Adelaide SA (AU); Alexander James Grant, Adelaide SA (AU)

(73) Assignee: MYRIOTA PTY LTD, Adelaide SA (AU)

( * ) Notice: Subject to any disclaimer, the term of this patent is extended or adjusted under 35 U.S.C. 154(b) by 0 days.

(21) Appl. No.: 16/078,503

(22) PCT Filed: Feb. 24, 2017

(86) PCT No.: PCT/AU2017/000058
§ 371 (c)(1),
(2) Date: Aug. 21, 2018

(87) PCT Pub. No.: WO2017/143388
PCT Pub. Date: Aug. 31, 2017

(65) Prior Publication Data
US 2019/0058522 A1     Feb. 21, 2019

(30) Foreign Application Priority Data

Feb. 25, 2016   (AU) ................................ 2016900685

(51) Int. Cl.
*H04B 7/185*    (2006.01)
*H01Q 3/00*     (2006.01)
(Continued)

(52) U.S. Cl.
CPC ........... *H04B 7/1851* (2013.01); *G06F 16/23* (2019.01); *H01Q 3/00* (2013.01); *H04B 7/18532* (2013.01);
(Continued)

(58) Field of Classification Search
CPC ........ G01S 19/34; G01S 19/258; G01S 19/27; G01S 19/05; G01S 19/42; G01S 19/46;
(Continued)

(56) References Cited

U.S. PATENT DOCUMENTS 6,078,286 A    6/2000  Gonzales et al.
6,373,431 B1   4/2002  Nakajima
(Continued)

OTHER PUBLICATIONS

Extended European Search Report, for EP Application No. 17755641.2, dated Sep. 18, 2019. (5 pages).

*Primary Examiner* — Golam Sorowar
(74) *Attorney, Agent, or Firm* — Seed Intellectual Property Law Group LLP

(57) ABSTRACT

A method of scheduling wake up times for terminals in a satellite communication system using satellite ephemeris data in order to extend battery life of terminals is described. The terminal periodically evaluates the stored ephemeris data to determine whether it is valid, recently valid, or invalid. When the ephemeris data is valid the terminal can schedule wake up times to either transmit or receive updated ephemeris data. For recently valid ephemeris data the terminal calculates possible satellite pass windows and schedules wake up time. For invalid data the terminal wakes and listens periodically with a period that is less than the expected satellite pass duration. It may repeat this process several times before sleeping for an amount of time less than the expected satellite pass duration and repeating. Additional gateway beacons may be used to provide ephemeris data, and satellites may also provide information on beacon locations.

22 Claims, 9 Drawing Sheets

(51) Int. Cl.
*G06F 16/23* (2019.01)
*H04W 52/02* (2009.01)
*H04W 88/16* (2009.01)

(52) U.S. Cl.
CPC .... *H04B 7/18539* (2013.01); *H04W 52/0216* (2013.01); *H04W 88/16* (2013.01); *Y02D 70/142* (2018.01); *Y02D 70/144* (2018.01); *Y02D 70/162* (2018.01); *Y02D 70/164* (2018.01); *Y02D 70/446* (2018.01)

(58) Field of Classification Search
CPC .......... G01S 19/03; G01S 19/09; G01S 19/10; G01S 19/20; G01S 19/23; G01S 19/24; G01S 19/254; G01S 19/35; G01S 19/37; G01S 19/48; G01S 19/52; G01S 5/0018; G01S 5/0236; H04W 64/00; H04W 4/02; H04W 56/0015; H04W 4/025; H04W 4/80; H04W 4/90; H04W 52/0203; H04W 52/0216; H04W 56/00; H04W 56/002; H04W 56/005; H04W 56/0075; H04W 72/005; H04W 76/50; H04W 84/18; H04W 8/205
See application file for complete search history.

(56) References Cited

U.S. PATENT DOCUMENTS

| | | | |
|---|---|---|---|
| 2008/0117103 A1* | 5/2008 | Wang | G01S 19/34 342/357.74 |
| 2009/0243929 A1 | 10/2009 | Sengupta et al. | |
| 2009/0278741 A1 | 11/2009 | Miyata | |
| 2010/0198512 A1* | 8/2010 | Zhang | G01C 21/26 701/530 |
| 2011/0175773 A1* | 7/2011 | Syrjarinne | G01S 5/0018 342/357.25 |
| 2011/0254733 A1* | 10/2011 | Abraham | G01S 19/27 342/357.66 |
| 2011/0309976 A1* | 12/2011 | Leclercq | G01S 19/34 342/357.25 |
| 2013/0324154 A1* | 12/2013 | Raghupathy | G01S 19/10 455/456.1 |
| 2014/0062770 A1* | 3/2014 | Gao | G01S 19/34 342/357.25 |

* cited by examiner

TERMINAL SCHEDULING METHOD IN SATELLITE COMMUNICATION SYSTEM

CROSS-REFERENCE TO RELATED APPLICATION(S)

The present application claims priority from Australian Provisional Patent Application No. 2016900685 titled "TERMINAL SCHEDULING METHOD IN SATELLITE COMMUNICATION SYSTEM" and filed on 25 Feb. 2016, the content of which is hereby incorporated by reference in its entirety.

BACKGROUND

Technical Field

The present disclosure relates to satellite communication systems. In a particular form the present disclosure relates to terminal scheduling in satellite communication systems.

Description of the Related Art

There is an increasing demand for machine-to-machine connectivity for small, low cost sensors and devices located in remote areas. Example applications include telemetry for agricultural sensors such as soil moisture probes, water irrigation pumps, and water tank level meters. Livestock tracking and other asset tracking are other applications of interest. Marine applications include ocean drifters measuring ocean currents and seawater temperatures.

Many of these applications are located in areas that do not have terrestrial communications networks such as cellular, and the cost of deploying a dedicated local wireless solution is prohibitive. For such applications, a satellite-based solution is attractive. Low cost microsatellites or nanosatellites in low earth orbit can provide cost-effective global coverage for such applications. In such a system, a low earth orbit satellite can provide intermittent communications opportunities to a ground-based user terminal as it passes overhead. In some cases it can be advantageous to augment a satellite service with terrestrially deployed gateways, such that terminals that are located within range of a gateway can communicate directly without needing to wait for a satellite to be overhead. This can both reduce the load on the satellite communications links, as well as provide other benefits, such as reduced latency.

Terminal battery life is a key parameter in such systems as these devices are deployed in remote areas where battery replacement is expensive or impossible. It is desired that the battery life be as long as possible. As a result it is desired to keep the terminal switched off, or in deep sleep mode for most of the time, and to only wake up when communications is desired. If a terminal wakes up to communicate and there is no satellite in view or no gateway in range, then this results in wasted power and reduced battery life.

If the terminal has no idea when it is in the footprint of a satellite, then it does not know when to turn on and communicate. Even if a satellite is overhead, it may not be able to acknowledge successful reception of the data from the terminal (open loop operation). One approach to this problem is to wake up periodically with a short period (e.g., 5 minutes) such that it is guaranteed at some point to communicate during a satellite pass (pass duration might be 10 minutes). While this will work, it is extremely wasteful of energy and greatly reduces battery life.

Alternatively, if the satellite can acknowledge successfully received transmissions from a terminal (closed loop operation), the terminal can wait for such an acknowledgement and if none is received, enter sleep mode and try again sometime later. However this approach may still require many unsuccessful transmission attempts with no satellite overhead. The terminal still needs to wake frequently to attempt transmission and the only real benefit is that it can stop once it knows its message has been successfully received.

A further problem for the terminal is how to optimize its transmission. For example if the geographic area it is in is crowded (many terminals), these terminals may wish to choose a different transmission strategy than in a sparsely populated region (load balancing). However as the footprint is often very large the terminals can not determine this information and so has no knowledge of the system load. Another example is where a terrestrial interferer, out of range of the terminal is causing interference as seen by the satellite. For example the interferer could be 1000 km away from the terminal, but both interferer and terminal are simultaneously seen by the satellite. The terminal would benefit from avoiding the channels used by the interferer, but is not aware of the problem.

There is thus a need to provide improved methods for scheduling terminal operation in such communication systems, or to at least provide a useful alternative to existing methods.

BRIEF SUMMARY

According to a first aspect, there is provided a method of operation of a terminal in a satellite communication system comprising:

a) receiving and storing, by the terminal, ephemeris data including validity data;

b) scheduling at least one wake up time based on the stored ephemeris data for transmitting data or for receiving updated ephemeris data, wherein the terminal enters a sleep state between scheduled wakeup times and is woken up at a scheduled wake up time;

c) waking up the terminal at a scheduled wake up time and performing the following steps before going back to sleep:

d) obtaining an estimate of the terminal's position and the global time;

e) determining, based upon the terminal's position and global time estimate, if the stored ephemeris data is valid, recently valid or invalid;

f) if the stored ephemeris data is valid then either transmitting data to a satellite or attempting to receive updated ephemeris data from a satellite;

g) if the stored ephemeris data is recently valid, then estimating a set of possible satellite pass windows based on the stored ephemeris data and scheduling a set of warm wake up times during which the terminal is woken up to attempt to receive updated ephemeris data;

h) if the ephemeris data is invalid then the terminal is scheduled to go to sleep and periodically wake up and attempt to receive updated ephemeris data with a period between wake up being less than an expected satellite pass duration, and if the attempt to receive updated ephemeris data was unsuccessful then the terminal goes back to sleep, and the terminal repeats this step until it successfully receives ephemeris data;

i) wherein upon receiving updated ephemeris data in steps f), g) or h), the ephemeris data is stored and the scheduling step b) is repeated.

In one form in steps f), g) or h) each attempt to receive updated ephemeris data comprises the terminal listening for a maximum attempt duration time period t unless it successfully receives ephemeris data whilst listening. In a further form in steps f), g) or h), each attempt to receive updated ephemeris data comprises a series of repeated attempts up to a predetermined maximum number of times n unless it successfully receives ephemeris data whilst listening, wherein it pauses between each attempt.

In one form in step b) a plurality of wake up times are scheduled, and at least one of the wake up times is a wakeup time to refine future wake up times, and comprises the terminal recalculating future scheduled wake up times based on the current estimate of the terminal's position and the global time obtained in step d).

In one form wherein the terminal monitors one or more of a Satellite Telemetry, Tracking, and Command/Control (TT&C) channel, or satellite beacon, or a gateway beacon, and if a TT&C channel, or satellite beacon, or a gateway beacon is detected the terminal is woken up to perform steps d) to i) before going back to sleep. In a further form, the terminal passively monitors for one or more of the TT&C channel, satellite beacon, or a gateway beacon.

In one form, in step i), after updated ephemeris data is received, the terminal listens for a gateway beacon, and if a gateway beacon is detected the terminal listens and receives a gateway position and stores the gateway position in a database of gateways. In one form, in steps f), g) or h) the terminal monitors for the presence of a gateway beacon before attempting to receive updated ephemeris data from a satellite, and if a gateway beacon is detected the terminal listens and receives a gateway position and stores the gateway position in a database of gateways, and receives the updated ephemeris data from the gateway beacon. In one form, in step f) or i) the terminal performs time interleaved monitoring for either a satellite or a gateway beacon, and receives updated ephemeris data from whichever of the satellite and gateway to first be detected.

In one form, the terminal is configured to receive performance data and/or capability data in addition to ephemeris data from a satellite or a gateway beacon, and this data is used to determine when to schedule a wake up time for transmitting data.

In one form, in step h), the terminal transmits data when awake.

In one form, the ephemeris data is valid for a first predefined time period, recently valid for a second predefined time period after the first predefined time period, and invalid after the second predefined time period, and determining if the stored ephemeris data is valid, recently valid or invalid is based on the estimate of the global time obtained in step d).

In one form, determining if the stored ephemeris data is valid, recently valid or invalid is based on an accuracy profile and an accuracy threshold for recently valid and an accuracy threshold for invalid.

In one form, when ephemeris data is received that is more recent that the stored ephemeris data, and the at least one wake up time comprises at least one future wake up time, the terminal recalculates the at least one future wake up time based upon the received ephemeris data and the current estimate of the terminal's position and the global time obtained in step d).

According to a second aspect, there is provided a terminal apparatus in a satellite communication comprising:
a receiver apparatus;
a transmitting apparatus;
a position and timing module;
a processor, and
a memory, wherein the memory comprises instructions to perform the method of the first aspect.

According to a third aspect, there is provided a satellite communication comprising a plurality of terminal apparatus of the second aspect, and a plurality of satellites, wherein one or more of the satellites are configured to transmit ephemeris data for the plurality of satellites to the plurality of terminals.

According to a fourth aspect, there is provided a terminal apparatus in a satellite communication comprising:
a receiver apparatus configured to receive ephemeris data transmitted by one or more satellites or a gateway in the satellite communication system, and configured to receive a beacon transmission from a gateway;
a transmitting apparatus configured to transmit data to one or more satellites or a gateway in the satellite communication system;
a position and timing module configured to estimate the terminal's position and the global time;
a memory for storing the received ephemeris data;
an alarm module configured to wake up the terminal apparatus from the sleep state to a wake state at one or more scheduled wake up times, and
a scheduling module configured to schedule at least one wake up time based on the stored ephemeris data for transmitting data or for receiving updated ephemeris data, and to put the terminals into a sleep state upon completion of one or more terminal operations whilst in the wake state;

and wherein upon wake up the scheduling module request the terminal's position and global time from the position and timing module, and is configured to determine, based upon the terminal's position and global time estimate, if the stored ephemeris data is valid, recently valid or invalid, and if the ephemeris data is valid, then the terminal is configured to either transmit data to a satellite or attempting to receive updated ephemeris data from a satellite, and if the stored ephemeris data is recently valid, then the scheduler is configured to estimate a set of possible satellite pass windows based on the stored ephemeris data and scheduling a set of warm wake up times during which the terminal is woken up to attempt to receive updated ephemeris data, and if the ephemeris data is invalid then the terminal is scheduled to go to sleep and periodically wake up and attempt to receive updated ephemeris data with a period between wake up being less than an expected satellite pass duration, and if the attempt to receive updated ephemeris data was unsuccessful then the terminal is configured to go back to sleep, and the terminal repeats operation until it successfully receives ephemeris data, and upon receiving updated ephemeris data, the ephemeris data is stored in the memory, and the scheduler schedules at least one wake up time based on the stored ephemeris data for transmitting data or for receiving updated ephemeris data and to put the terminal into a sleep state upon completion of one or more terminal operations whilst in the wake state.

BRIEF DESCRIPTION OF THE DRAWINGS

Embodiments of the present disclosure will be discussed with reference to the accompanying drawings wherein.

In the following description, like reference characters designate like or corresponding parts throughout the figures.

DETAILED DESCRIPTION

Figure 1A:
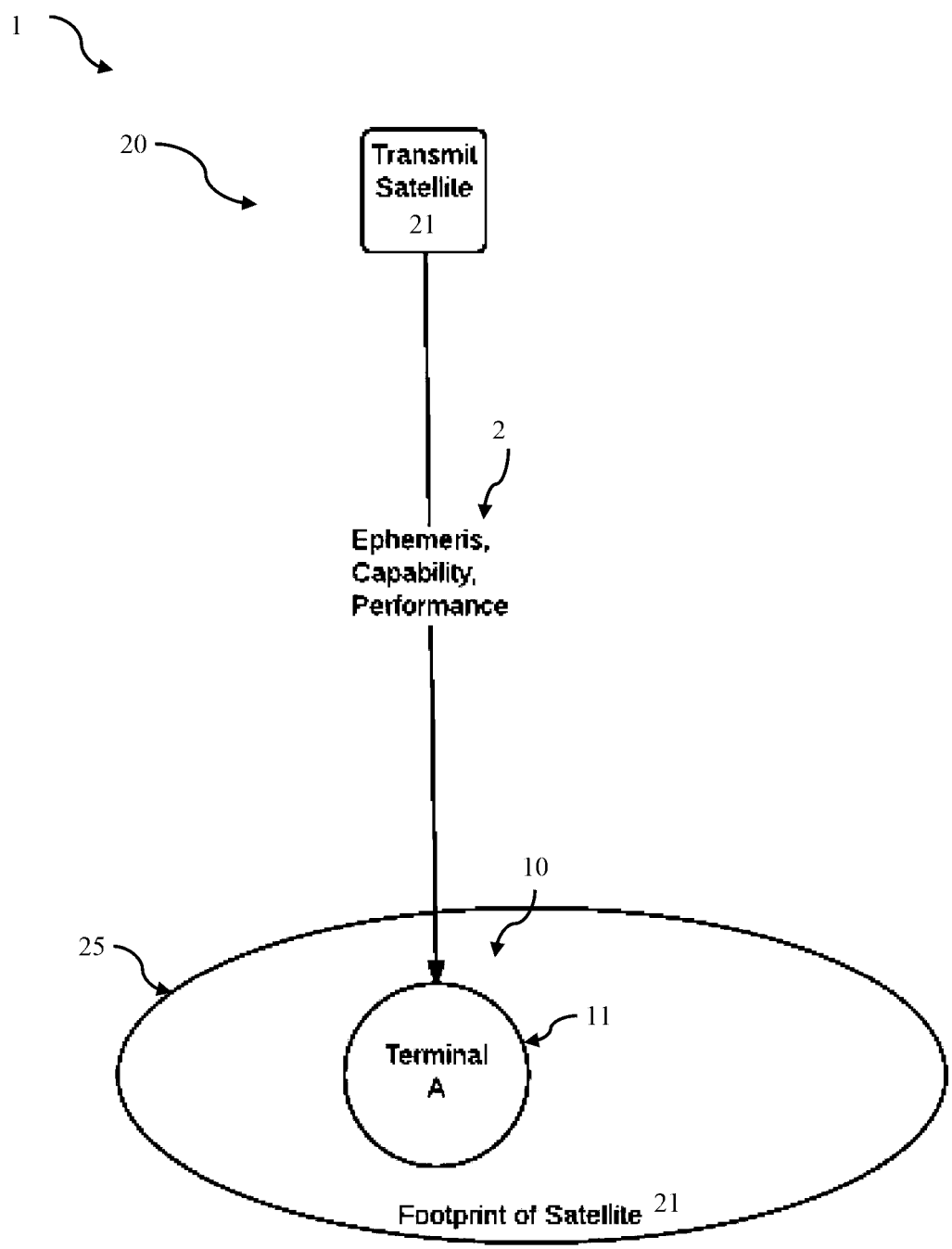
FIGS. 1A, 1B and 1C are a schematic representation of a satellite communication system according to an embodiment.
Figure 1B:
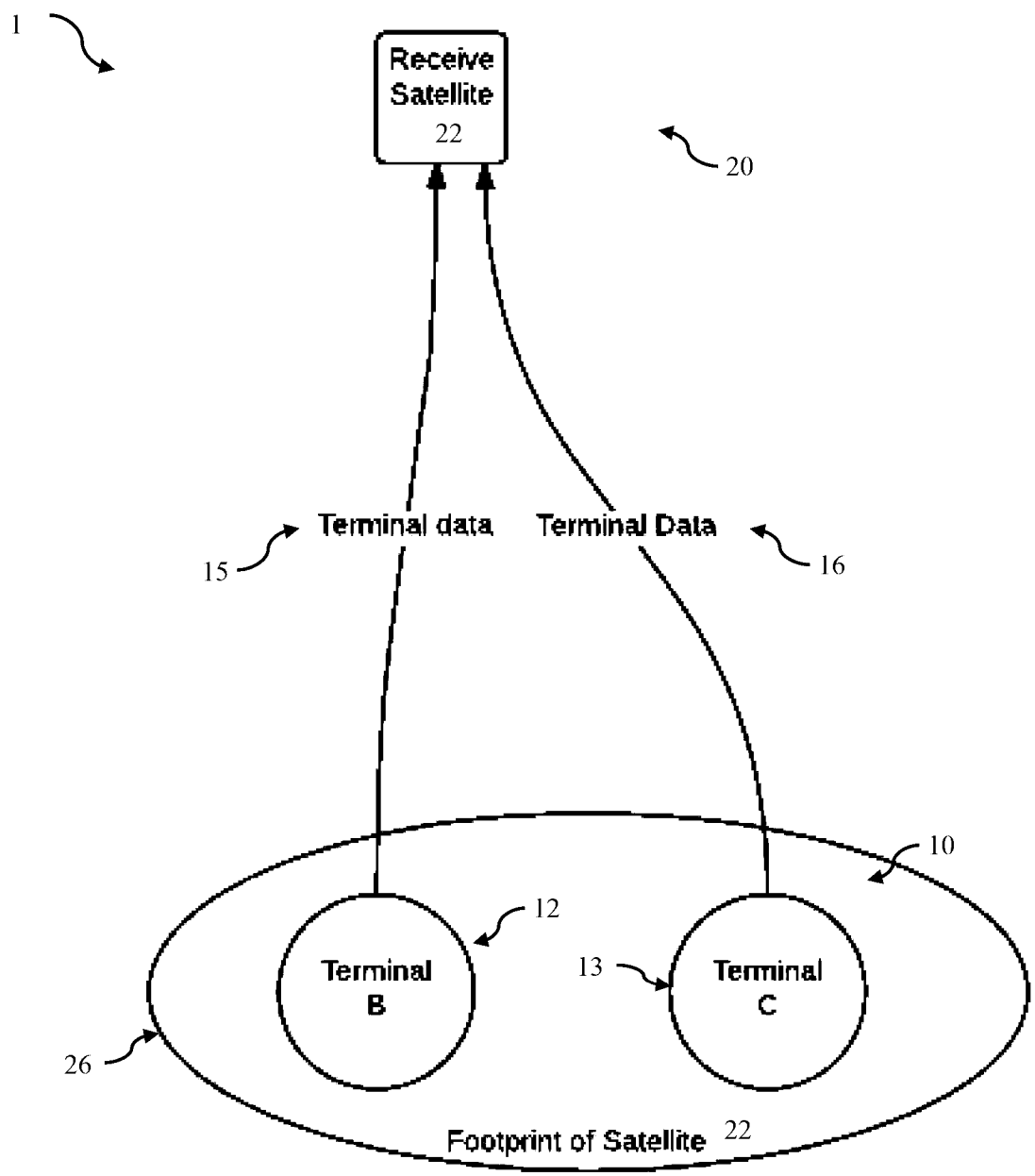
Figure 1C:
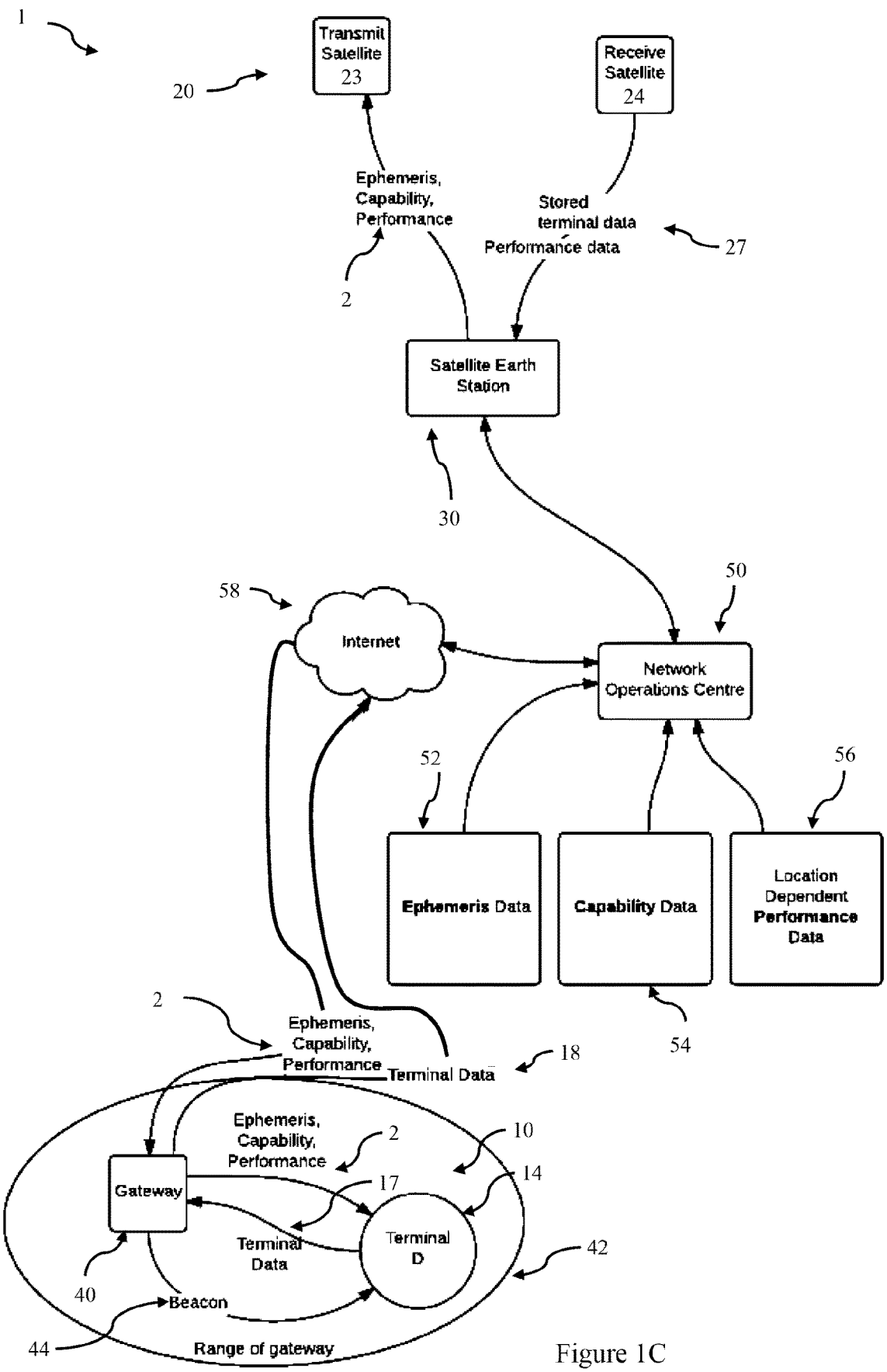

FIGS. 1A, 1B and 1C are a schematic representation of a satellite communication system 1 according to an embodiment. The main components of system 1 are terminals 10, satellites 20, earth stations 30 and gateways 40.

Terminals 10 are terrestrially deployed communications devices that have the capability to communicate with satellites 20 (when the satellite is in the field of view), and with gateways 40 (when in range). In the embodiment shown in FIGS. 1A to 1C, four terminals 11 12 13 14, four satellites 21 22 23 24, one earth station 30 and one gateway 40 are shown.

Terminals are equipped with a position and timing module to determine their position and coarse global timing. For example the position module may be a Global Navigation Satellite System (GNSS) or Global Positioning System (GPS) receiver module, an assisted GPS receiver module, or receiver module for similar positioning systems such as those using high altitude and/or terrestrial transmitters. By global timing, we mean time that is consistent with an agreed global clock, e.g., GPS time. This could also be a system clock maintained by the satellite system. This time reference does not need to be very accurate for the purposes of our scheduling solution described below, e.g., accurate to within a few seconds would be sufficient. Similarly, position does not need to be very accurate, e.g., accurate to within hundreds of meters would be sufficient.

There is a constellation of one or more satellites 20. These satellites are in orbit and at any instance see only a certain region (footprint) of the surface of the Earth. Satellites can only communicate with ground based terminals within their footprint. For example in FIG. 1A satellite 21 has a footprint 25 including terminal 11, and in FIG. 1B satellite 22 has a footprint 26 including terminals 12 and 13. Satellite 21 can thus communicate with terminal 11 but not simultaneously communicate with terminals 12 and 13 (and vice versa for satellite 22).

For example, a satellite in low earth orbit at an altitude of 700 km will have a footprint with diameter approximately 5000 km and orbit the earth every 90 minutes. It will be in view at a particular point on the earth for approximately 10 minutes at a time. Depending on latitude and orbit inclination there may be only a few such passes per day. A satellite in polar low earth orbit typically sees each point on the earth's surface four times per day, in pairs of passes ninety minutes apart, separated from the next pair of passes by at most twelve hours.

In some embodiments, each satellite, or groups of satellites, can have different capabilities and performance characteristics. Capability data is data that describes the capability of the satellite such as frequencies, transmit and receive capabilities, number of multiple users that can be supported, antennas, hardware, beam pattern, gains, etc. Performance data is data that describes the performance of the satellite. This data may be both satellite dependent and location dependent. For example, a satellite having access to certain receive frequency channels may have poorer performance over one country where there is located a strong interferer at that frequency.

Satellite ephemeris data is data that describes the orbital parameters of a satellite—that is location dependent pass schedule data, or simply scheduling data. For the sake of simplicity and to aid understanding, the term ephemeris data will be used throughout the specification. However it is to be understood that in the context of this specification ephemeris data (or more explicitly, satellite ephemeris data) is to be considered equivalent to location dependent pass schedule data.

As there are uncertainties associated with prediction and measurement of orbits, the ephemeris data (or scheduling data) expires after some time, and needs to be regularly updated (i.e., re-estimated/recalculated). The ephemeris data may be assigned a fixed expiry date and/or an accuracy profile over time. The accuracy profile may be in the form of probabilistic estimates or confidence intervals of the validity or accuracy of the ephemeris data as a function of time. This accuracy information may be provided for the complete set of ephemeris data (i.e., all satellites), or for a subset of orbital parameters or satellites, or accuracy or confidence intervals may be assigned to individual parameters. The accuracy information may be provided as accuracy estimates/values at fixed dates and times (e.g., every 3 hours) or the date/time at which the estimated accuracy drops below a set threshold may be used. For example a set of one or more of accuracy thresholds or probability thresholds may be provided such as thresholds selected from common values such as 99%, 95%, 90%, 75%, 67%, 50%, 33%, 25%, 10%, 5%, or 1%. However it is to be understood that other threshold values or methods of calculations could be provided. For example parameters could be provided as mean and variance estimates, including the use of robust estimators.

All satellites are able to communicate with a network of earth stations but may have differing terminal transmit and receive capabilities. That is from the perspective of the terminals, a satellite may be configured as receive only, transmit only or configured to both receive and transmit (although not necessarily responsively). The transmit and/or receive frequency bands may be different and may be different from satellite to satellite. The communication link may be store-and-forward, digital bent pipe (signal is sampled by the satellite and digitally downloaded at some later time to an earth station) or linear bent-pipe (satellite acts as a passive relay when both the terminal and earth station are simultaneously in the footprint). The satellites may have different equipment, e.g., different antennas or amplifiers that result in different performance characteristics Receive-only satellites may not have the capability to acknowledge transmissions from terminals. Satellite 22 in FIG. 1B is an example of a receive only satellite, as it can receive terminal data 15 16 transmitted by terminals 12 13 within its footprint 26. As mentioned receive only satellites can communicate with earth stations 30 including transmitting to earth stations. Satellite 24 in FIG. 1C is an example of a receive only satellite which is shown sending (i.e., transmitting) stored terminal data received from terminals during previous orbits, as well as performance data, with the satellite earth station 30.

Transmit-only satellites have the capability to transmit data to the terminals, but do not have the capability to receive data from terminals. Satellite 21 in FIG. 1A is an example of a transmit only satellite 21, which in this embodiment transmits ephemeris, capability and performance data 2 to terminal 11 in its footprint 25. However it is to be noted that the transmit data may be one or more of ephemeris, capability or performance data. Other data may also be transmitted. As mentioned transmit-only satellites can communicate with earth stations 30 including receiving transmissions from earth stations. Satellite 23 in FIG. 1C is an example of a transmit-only satellite which is shown receiving ephemeris, capability and performance data 2 from the satellite earth station 30. This is then stored by the satellite and can be transmitted during its orbit to any listening transmitters.

A transmit and receive satellite can transmit to and receive data from terminals. However in some embodiments these capabilities are not responsive or interactive. That is satellites may not have the capability to transmit an acknowledgement or respond to a transmitting terminal. For example a satellite may be able to transmit a pre-stored message or data to the terminal (e.g., ephemeris data), but it may not be able to interactively respond to a message received from a terminal.

An earth station 30 is a terrestrial facility that is used by the satellite operator to communicate with a satellite for the purposes of controlling the satellite, to receive data transmitted from terminals (either in store and forward mode, or bent pipe), and to transmit data to terminals (again either in store and forward mode, or bent pipe). The radio channels used for earth station communications with the satellite may be different to those used for satellite-terminal communications. The system may use one or more earth stations, and each earth station 30 is connected to a network operations center 50. The network operations center may be coincident with a satellite earth station. The network operations center 50 acts as a command and control center for the system and stores and/provides ephemeris data 52, capability data 54 and location dependent performance data 56 to the satellite earth stations for transmission to satellites in the constellation. This data may be generated by modules located at the network operations center 50 or provided by third parties. The network operations center 50 also manages storage of terminal data collected via the satellite network and relayed to the earth stations. Terminal data may be stored at the network operations center or forwarded to a data warehouse or to users. The network operation center may also be connected to the internet 58 to allow sharing of data.

The ephemeris data module 52 calculates and updates ephemeris data or more generally location dependent pass schedule data for each of the satellites in the constellation. In one embodiment the ephemeris data and uncertainties (i.e., accuracy) is calculated or estimated using a computer model and tracking data that takes into account known positions, orbital dynamics equations, relativistic effects, estimation errors, etc. Updates may be provided on a continuous basis, for example as any new information is obtained such as new tracking data, or at scheduled times or periodically such as every hour, every 6 hours, every 12 hours, daily etc. Estimates could also be provided on as required basis. For example as a satellite is approaching a ground station 30, the ground station could request an updated ephemeris from the network operations center for uploading to the satellite. It will also be understood that in some embodiments, different satellites will have different ephemeris data based upon when the ephemeris data was uploaded to the individual satellite. Typically this will not affect terminals, as typically the time between updating ephemeris data at a terminal will be much greater than the differences in times between uploading of ephemeris data for satellites in the constellation so that is even the oldest ephemeris data stored by a satellite will be newer than ephemeris data of the terminal. If this was not the case the terminal could choose to delay updating the ephemeris until a satellite with a more up-to-date ephemeris is in view. Additionally the ephemeris data could contain update information such as when ephemeris data is scheduled to be uploaded to satellites so that a terminal can select the time to wake up based on which satellite (from a set of possible satellites) is likely to have the most up-to-date ephemeris data.

In some embodiments transmit capable satellites periodically transmit ephemeris data (or equivalently location-dependent pass schedule data) for the entire constellation. The period may be chosen such that during any one satellite pass over a point on the earth surface, there are multiple opportunities for a terminal to receive this data, i.e., the period is less than time taken for the footprint to pass over a transmitter. In some embodiments the times and locations when satellites will transmit ephemeris data may also be provided to terminals as part of the ephemeris data. In some embodiments transmit capable satellites continuously transmit ephemeris data to terminals. The satellites may also transmit capability and performance data to terminals. In some embodiments this may be performed using the same period (or frequency) as ephemeris data, for example immediately after transmission of ephemeris data or at a fixed time offset (e.g., 5 minutes after). In some embodiments a different period (or frequency) may be used. For example ephemeris data could be transmitted twice as often as performance data and capability data (i.e., ephemeris data could be interleaved between the two). Similarly the satellites could continuously transmit ephemeris data, capability data, and performance data. Selection of the periodicity may be based on the rate of change of the underlying data. That is the accuracy as a function of time may be used in determining when to transmit.

Capability data relates to system capabilities and will typically not change rapidly, and in some embodiments is updated on an as needs basis. For example if a satellite experiences problems an update may be issued to alert terminals to avoid using a particular satellite, or of any changes required to communicate with the satellite. Location dependent performance data is used to provide terminals with information on system load including regional loads, expected outages, geographic distribution or density of terminals, interference maps (frequencies to avoid at particular times) and location dependent interference sources, and other performance and capability data that may assist transmitters to optimize their transmissions. The performance data may also have a temporal element. For example if an interference source may only be present during certain hours, or a space weather event (e.g., solar flare) may be expected to affect system capabilities, or generate interference over a certain time period (e.g., 1-2 days). This information may be collected by terminals and satellites in the system, as well as a range of other sources which may be internal or external of the system such as a space weather forecaster. As discussed above, the capability and performance data may be issued at regular intervals (e.g., every 3, 6, 12 or 24 hours), or at predetermined times such in anticipation of a satellite approaching an earth station, or on demand/on a continuous basis (i.e., in response to a request). As discussed above in relation to ephemeris data, accuracy estimates or expiration dates may also be calculated and provided for capability data and performance data.

Gateways 40 are terrestrial apparatus that the terminals can also communicate with. Gateways can both transmit to and receive from terminals. Gateways have their own backhaul connection to the network operations center. This may via a satellite earth station 30, via the Internet 58, or via third party means such as 3G/other satellite channels, WiFi etc. Gateways are used to provide terrestrial hotspots but do not provide blanket coverage. In some embodiments a terminal may be in the footprint of a satellite and in the footprint of a gateway. In such circumstances terminals can decide which apparatus to transmit to, for example based on power, quality (e.g., Signal to Interference plus Noise Ratio or SINR) or load estimates or measurements. For example selection could be based upon which is target requires the least amount of transmit power to ensure reliable reception. As shown in FIG. 1C, gateway 40 has a footprint 42 including terminals 14. In some embodiments the gateway 40 transmits a beacon 44 and/or ephemeris, capability and performance data 2 to terminals in the footprint (i.e., communication range) of the gateway, and receives terminal data 17 (in this embodiment from terminal 14). Each gateway may transmit its location to nearby terminals. Gateways may periodically broadcast the satellite ephemeris (and other data) at the same, or at a different period to the satellites. The gateway is connected to the network operations center 50 via the internet 58, and sends or transmits any collected terminal data 18 to the network operations center 50 (via internet 58), and similarly receives ephemeris, capability and performance data 2 from the network operations center 50 (via internet 58). In some embodiments the satellites transmit a database of gateway locations to terminals. In some embodiments a terminal can request ephemeris data or satellite schedule data from a gateway. Additionally a gateway may also transmit a database of gateway locations (obtained from the network operation center) to terminals.

A terminal 10 can be in a number of states or modes: cold start, warm start, or synchronized. In addition the terminal 10 can be in different activity modes or level such as awake or asleep in any of these states. An embodiment of a method of operation 200 of a terminal apparatus 10 will now be described with reference to FIGS. 2A to 2D, which each show parts of a flowchart of the method and how the terminal can move between states and activity modes (or levels).

The terminal is in a synchronized state 202 if it has a valid set of ephemeris data 214 and/or is in range of a gateway 40 to which it can transmit data or receive ephemeris data (thus bypassing a satellite). A terminal enters the cold-start state 270 if the terminal has no valid ephemeris data and if there is no gateway in-range, or if on wake up, an expected in-range gateway is not within range (i.e., no beacon is detected). A terminal enters a warm start state 260 if its ephemeris data is no longer strictly valid, but still recent (i.e., recently valid state). The time period during which ephemeris data is considered recent, and thus a warm start mode may be entered rather than a cold start mode, may be a predefined time period (e.g., based on a fixed time period such as 12 hours or 1 day, or based on a predefined accuracy threshold such that the predefined time period ends when the accuracy reaches this threshold), or a defined period determined by the network operations center and included with the ephemeris data. That is the data is valid for a first predefined time period, recently valid for a second predefined time period after the first predefined time period, and invalid after the second predefined time period. Thus determining if the stored ephemeris data is valid, recently valid or invalid can be based on an estimate of the global time. For example the ephemeris data may be considered valid for 7 days (after issuance), recently valid (i.e., warm start) for a further 2 days, and invalid (i.e., cold start) at times after that. In some embodiments the ephemeris data is supplied with an accuracy profile which comprises accuracy or probabilistic estimates of the validity or accuracy of the ephemeris data as a function of time. Accuracy thresholds for valid/recently valid (warm) and recently valid/invalid (i.e., warm/cold start) can then be defined based on accuracy criteria such as probability thresholds or confidence intervals. For example a valid/recently valid (warm) threshold could be at 90% (the recently valid accuracy threshold) and warn/cold start thresholds could be 50% (the invalid accuracy threshold). Of course other sets of values (valid/warm threshold, warm/cold threshold) could be used such as (99%, 66%), (90%, 10%), (50%, 5%) etc. The predefined time period is thus the time at which the accuracy drops below the threshold, or a time period defined based on a confidence interval for the predefined accuracy threshold. The terminal could also use other data or criteria to assess whether to enter warm or cold start modes.

From valid satellite ephemeris data and optionally gateway location data, a terminal can determine a schedule of transmit and receive opportunities. The terminal makes its own decision when to next wake up to transmit its own data or to receive an ephemeris data update, for example during a satellite pass prior to the ephemeris data no longer being valid to ensure the terminal can maintain valid ephemeris data and thus stay in the synchronized state. In some cases, terminals may know when they expect to have data to transmit, for example based on scheduled data collection activities or sensor configurations. For example a sensor may log data every minute or every hour and relay collected data back to the base station once a certain quantity of data is collected (for example 64, 128, 256 bytes, etc.) or at regular time interval such as every 24 hours. In another embodiment the terminal may be configured to wake up based on receiving a wakeup signal from a sensor (or other component). For example a sensor on board the terminal or in communication with the terminal may be configured to generate a wakeup signal when it has data to transmit. A terminal may also decide its transmit parameters based on the ephemeris data and/or the optional location-dependent data (Tx power, repeat rate, coding, etc.). Based on its own estimate of the chance of communications success, the terminal may choose to wait for a better pass (rather than the next pass), or a pass that reduces the required terminal power. Generally the terminal will schedule transmit times when the ephemeris data is valid. However in some cases the next time the terminal expects to have (or will have) data to transmit will be during a time when the ephemeris data is invalid, and thus it will be difficult to predict an accurate transmission time. In this case an approximate transmit time may be scheduled, and a wake up time can be scheduled to receive updated ephemeris data (i.e., this may be near to the time the ephemeris data is expected to become invalid). Once this updated ephemeris data is received, the scheduled wake up transmit time (an in fact any scheduled wake up times) can be refined based on the more recent ephemeris data. This process can be repeated as many times as required (for example if the expected transmit time is several times the validity time length of the ephemeris data). Further gateway location data may also be used when scheduling wake up times—either for transmit times when the current ephemeris data will be invalid or in order to obtain new (valid) ephemeris data from a gateway. For example if there is a gateway within range of the terminal (i.e., nearby) and the terminal is not expected to move out of range before it next expects to have data to transmit, then the terminal could schedule a wake up time for that time (i.e., when it expects to have further data to send) Similarly if the terminal is expected to move within range of another gateway, then a wake up time could be scheduled for the time the terminal is expected to be in range of that gateway. This may be to transmit data, or to receive updated ephemeris data, in which case future wake up times may be refined once updated ephemeris data is received.

Wake up for updating schedule (e.g., ephemeris data) can happen at an independent cadence compared to wake up times for transmission of terminal data. The terminal only needs to wake up for an ephemeris data update if the current schedule is approaching the expiration date. That is the terminal can review the ephemeris data and the validity information such as an expiration date, or the accuracy profile (as a function of time), and determine an appropriate time to wake up to obtain updated ephemeris data. Optionally whenever updated ephemeris data is received (whether in the case that that a terminal has woken up just to receive updated ephemeris data or at other times), the terminal may reschedule (or refine) future wake up times based on the recently received (i.e., updated) ephemeris data.

When the terminal 10 is awake, it can also listen for a gateway beacon 44. If a beacon is heard, the terminal can further listen and receive the gateway position data. The terminal then adds the gateway position to its own database of gateways (and their positions/locations). If the terminal determines that it has a gateway in range it enters, or stays in synchronized mode whilst in range of this gateway. In other embodiments the terminal may monitor for the presence of a gateway 40 before monitoring for the presence of a satellite 20, or it may perform time interleaved monitoring for the presence of a satellite or gateway.

Figure 2A:
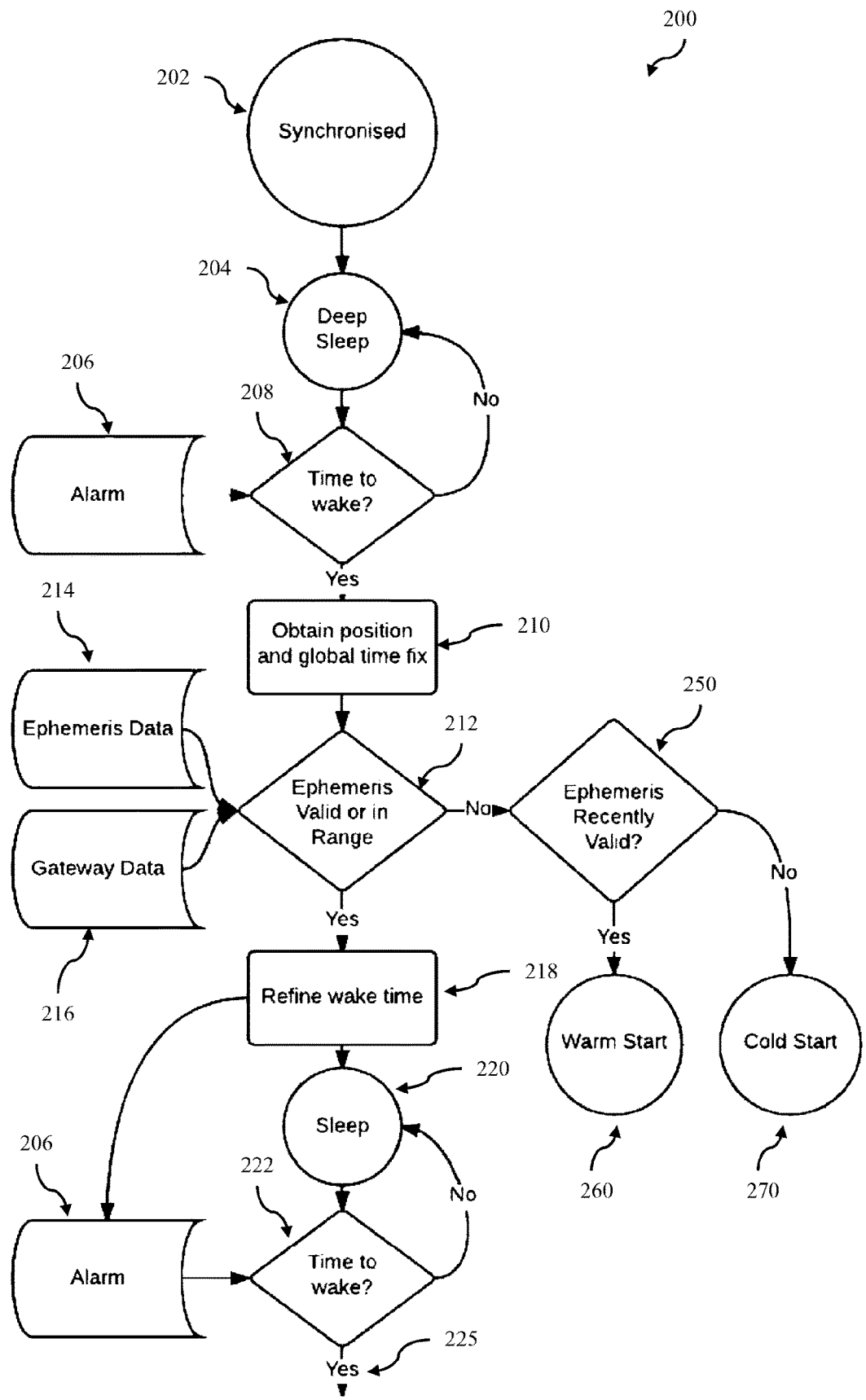
FIG. 2A is a flowchart of a first part of a method of operation of a terminal apparatus according to an embodiment.

When terminals are awake they perform a variety of tasks such as receiving and processing sensor data and any transmit or receive operations (multiple back to back data transmissions can be performed). Once these tasks are completed the terminal can enter a deep sleep state in order to conserve battery power until the next period of activity. As illustrated in FIG. 2A, we start our discussion with a terminal in the synchronized state 202 that is in a deep sleep mode 204. Before entering the deep sleep mode 204 an alarm 206 is set (in fact multiple alarms may be set for different scheduled tasks). The alarm module 206 is configured to monitor the terminal's clock and when it is time to wake generates an alarm trigger 208 that wakes the terminal up (otherwise the terminal remains in the deep sleep mode). As the terminal wakes the terminal attempts to obtain position and global time fix from the position and time module (e.g., GNSS module) 210. Note that in some embodiments system time and/or coarse location could be obtained or estimated from a gateway signal (including a beacon 44). An ephemeris monitoring module then uses the time and position information to determine if the ephemeris is valid 212 based on the ephemeris data 214 stored in a memory (and which was previously obtained from a satellite or gateway). Alternatively if the ephemeris data is not valid, but based on the obtained position a gateway database 216 indicates a gateway is in range of the terminal then valid ephemeris data can be obtained from the nearby gateway. Similarly if the ephemeris data is valid and the gateway database 216 indicates a gateway is in range of the terminal (based on the obtained position) then the terminal can elect to receive newer (valid) ephemeris data 214 from the nearby gateway and use this to update the stored ephemeris data. Further the terminal can elect to refine any schedule wake up times 218 based on the newer (i.e., more recently received) ephemeris data 218. If the ephemeris data 214 stored by the terminal is not valid, for example based upon an expiry date/time or accuracy threshold (as discussed above), the ephemeris module determines if the ephemeris is recently valid 250, such as based on the time since the ephemeris expired and/or ephemeris accuracy information and accuracy thresholds (as discussed above). If the ephemeris data is estimated (or determined) to be recently valid, the terminal is switched into the warm start state 260, and if the ephemeris is expired and/or not recently valid, then the terminal enters the cold start state 270 (see FIG. 2D). In another embodiment (not shown), the terminal may monitor a Satellite Telemetry, Tracking, and Command/Control (TT&C) channel, or some other beacon channel, either passively or actively and use this to trigger the terminal to wake up, effectively bypassing a scheduled wakeup (i.e., enter the flowchart at the first Time to Wake step 208 in FIG. 2A).

As mentioned previously a terminal can determine a schedule of transmit and receive opportunities (i.e., a schedule of wake up or receive times) using the ephemeris and other data. At such times the terminal is woken by alarm module 206. Optionally the terminal may schedule an early wake up time, or a wakeup outside of a scheduled transmit or receive opportunity (based on ephemeris data) in order to determine its position as it may have moved whilst asleep. In this case it may recalculate or refine transmit/receive opportunities 218, for example based on its own more recent position and time fix 210. The wake up time(s) is adjusted 218 by sending the next wake time to the alarm module 206 (or updating a schedule or table used by the alarm module) after which the terminal goes to sleep 220 until it is time to wake (as signaled by the alarm module) for a transmit or receive opportunity 225. If the wake up time (208) is a wake up time for a transmit or receive opportunity 230, and the ephemeris data is valid or a gateway is in range 212, the terminal can simply progress to point 225 from 212 and does not need to refine the wake up time and go back to sleep (220).

Figure 2B:
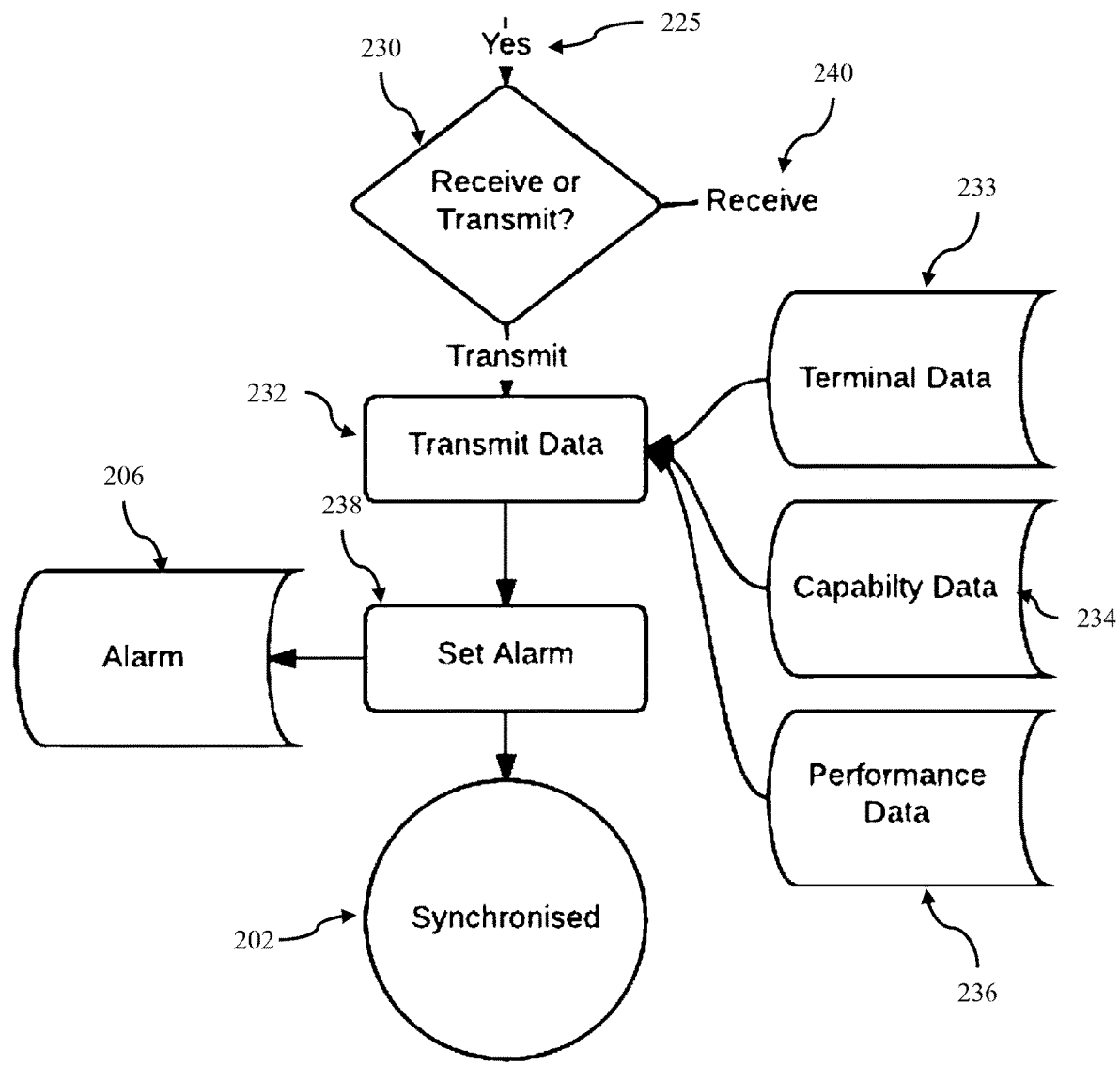
FIG. 2B is a flowchart of a second part of a method of operation of a terminal apparatus according to an embodiment.
Figure 2C:
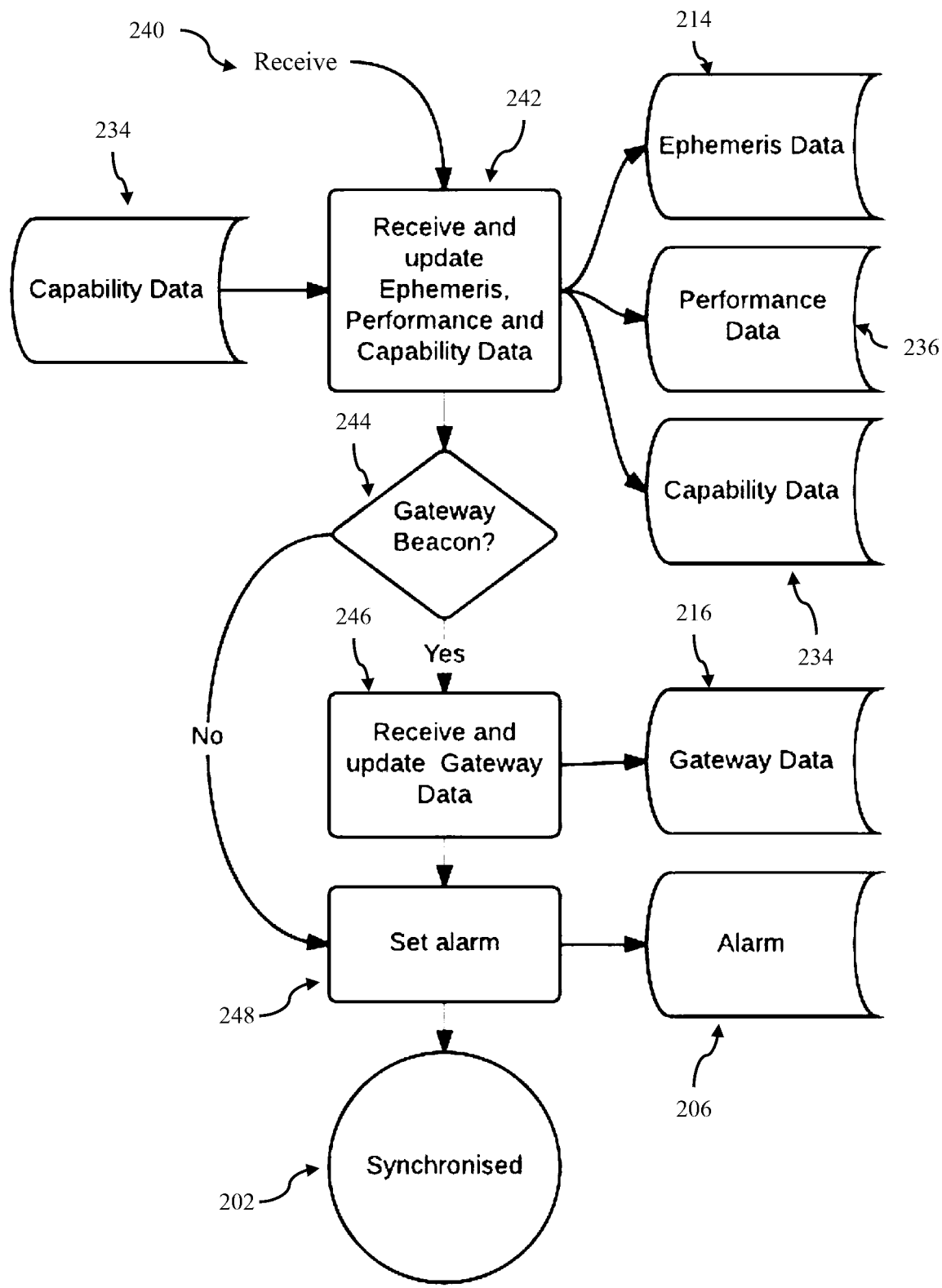
FIG. 2C is a flowchart of a third part of a method of operation of a terminal apparatus according to an embodiment.

With reference to FIG. 2B, at point 225 the terminal decides whether to transmit data or to receive updated ephemeris data from a satellite 230. If the terminal decides to transmit, then the terminal collects stored terminal data 233 or obtains and optionally processes data for transmission from sensors or other sources. The terminal data 233 is prepared for transmission (e.g., encoding, modulating, etc.), and is then transmitted to the satellite 232. The terminal may optionally makes use (or even transmit) of capability data 234 and performance data 236 when performing the transmission 232 (or preparing the data for transmission). If there is no further data to transmit (multiple transmissions may be made whilst the terminal is awake), and the terminal does not wish to receive updated ephemeris data (path 240) then the terminal sets the alarm 238 in the alarm module 206 to the next wake up time for the next transmit or receive opportunity to obtain updated ephemeris data enters deep sleep (and thus returns to the start of the flowchart 202 in the synchronized state). With reference to FIG. 2C, if the terminal decides to receive ephemeris data 240, the terminal checks stored capability data 234 to determine receive configuration requirements for the current satellite, and receives and updated ephemeris data 214, performance data 236 and capability data 234 which is then stored by the terminal 242 (replacing or augmenting previously stored data). The terminal may then listen for a gateway beacon 244, and if a gateway beacon is detected the terminal may receive gateway position data (and other gateway data) and the stored gateway data 216 is updated with this information. Once this gateway data is stored, or if no beacon was detected, then terminal then sets the alarm 248 in the alarm module 206 to the next wake up time for the next transmit or receive opportunity to obtain an updated ephemeris and returns to the start of the flowchart 202 in the synchronized state. In another embodiment the terminal may attempt acquisition of the satellite prior to receiving and updating ephemeris data, and if the acquisition attempt is not successful it may then either switch to searching for a gateway beacon, or switch to another state such as cold start.

Figure 2D:
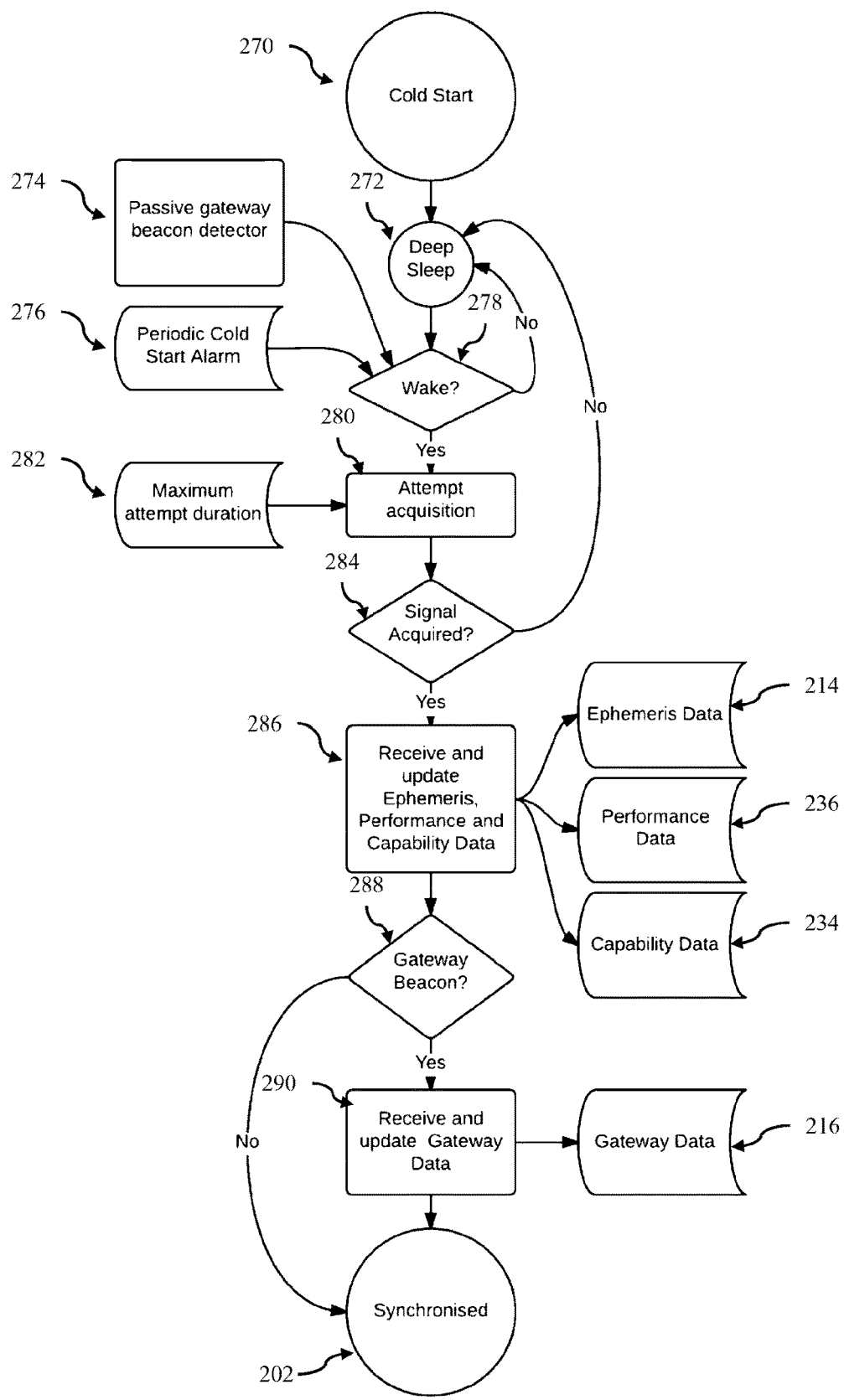
FIG. 2D is a flowchart of a fourth part of a method of operation of a terminal apparatus according to an embodiment.

With reference to FIG. 2D, in the cold start mode 20, the terminal is asleep 272 and a periodic cold start alarm 276 is used to periodically wake up the terminal 278 to listen, that is attempt to acquire a satellite 280 to obtain updated ephemeris data from. The periodic cold start alarm has a period t that is less than the expected satellite pass duration T (periodic cold start alarm). If no signal is acquired 284 within some maximum attempt duration 282 time period the terminal goes back to sleep 272 where it will again be woken by the periodic cold start alarm 276. The terminal may optionally repeat the listening process 280 a predetermined number of times n until it successfully acquires a signal 284 (omitted from the flowchart for clarity). That is an attempt may comprise the terminal making a series of repeated attempts to obtain ephemeris data whilst awake. The terminal may pause listening (e.g., power down the communications module or put the module to sleep), that is not listen, perform other tasks, or even sleep for a period of time between each of these attempts. This pause time between attempts may be fixed or variable. For example the terminal may attempt to acquire a satellite for a time t, and if unsuccessful then it performs other tasks before making a further attempt. The terminal may store a maximum number of attempts n to limit how many times it tries during a wake up period. If no signal is acquired (e.g., after n attempts) the terminal again sleeps for an amount of time τ that is no longer than the expected pass duration T. The terminal repeats this entire process until it successfully obtains the ephemeris data.

Figure 5:
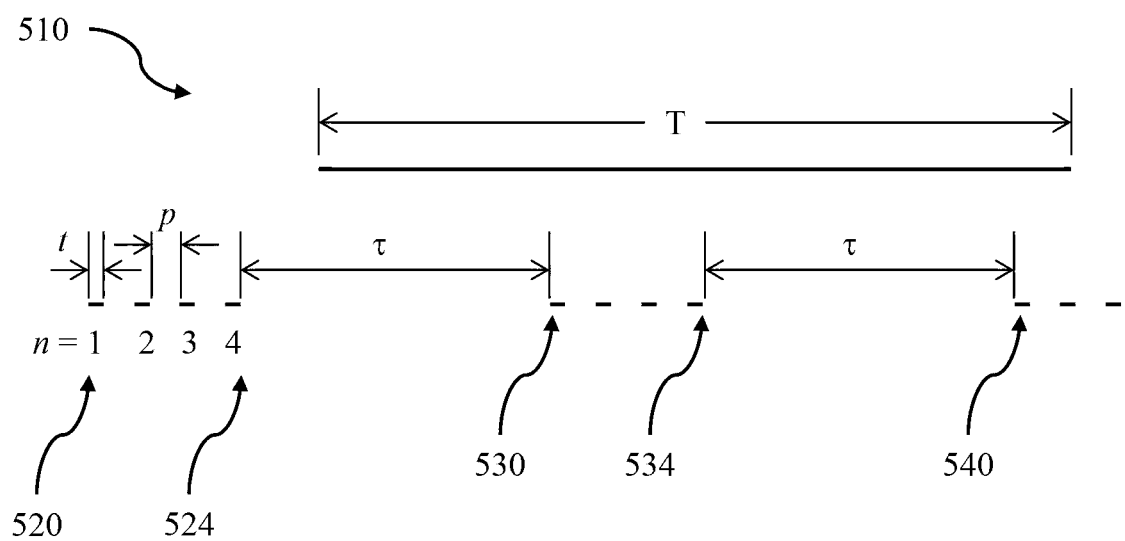
FIG. 5 is a schematic diagram illustrating the listening times of a terminal in a cold start state according to an embodiment.

This is illustrated in FIG. 5. A satellite pass 510 has a duration T. A terminal wakes at time 520 and listens for a time period t (the maximum attempt duration time period t). As the satellite is not in view, no satellite ephemeris data is received, and the terminal goes to sleep before retrying. In this embodiment the terminal is allowed to try a maximum of 4 times (n=4), with each attempt lasting the maximum attempt duration time period t and having a constant length pause p between attempts, and after the fourth attempt at time 524, the terminal has failed to receive satellite ephemeris data (as the satellite is still not yet in view). In this embodiment the terminal pauses (sleeps or does not listen) for a short time or pause length p between each of these attempts. Note that in other embodiments the pause length p may vary between attempts. After each unsuccessful batch of attempts the terminal goes to sleep for a time τ, which is less than the expected pass duration T (i.e., τ<T). In this embodiment the terminal wakes up again at time 530, retries 4 times, before going back to sleep for a time τ. At time 540 the terminal wakes and again listens for the satellite ephemeris data. The procedure is repeated until the satellite ephemeris data is received. For example, if the terminal receives the satellite ephemeris data at time 530 the search procedure would be terminated, and the terminal would update the satellite ephemeris data and enter the synchronized mode with valid ephemeris data (enabling new wake up times to be determined).

In some embodiments, the terminal has a two-stage receiver that first passively looks for received energy in a particular frequency band and if detected will wake up the main receiver (passive gateway beacon detector 274). For example, it may collect energy in the Telemetry, Tracking, and Command/Control (TT&C) channel of a satellite or passively detect gateway beacons. The terminal selects wake and sleep periods carefully in order to avoid wasting power and will repeat this process of attempting to acquire a signal until it either successfully obtains the ephemeris data, or it reaches a maximum number attempts, or the total time spent trying to detect a satellite exceeds a threshold, or the time since the first attempt exceeds a threshold. In these cases the terminal may enter a sleep mode for an amount of time that is no longer than the expected pass duration before restarting the cold state procedure 270. In another embodiment, the terminal may monitor a Telemetry, Tracking, and Command/Control (TT&C) channel, or some other beacon channel, either passively or actively and use this to trigger the terminal to wake up, at the first Wake step in FIG. 2D. In another embodiment the terminal may monitor for the presence of a gateway before monitoring for the presence of a satellite, or it may perform time interleaved monitoring for the presence of a satellite or gateway.

If a signal (satellite or gateway beacon) is acquired 284 then the terminal receives and updates ephemeris, performance and capability data 286 which is then stored by the terminal (updated ephemeris data 214, performance data 236 and capability data 234). The terminal may then listen for a gateway beacon 288, and if a gateway beacon is detected the terminal may receive and update gateway position data (and any other gateway data) 290 which is then stored (updated gateway data 216). Once this is stored, or if no beacon was detected, the terminal then sets the alarm in the alarm module 206 to the next wake up time for the next transmit or receive opportunity or to obtain an updated ephemeris and returns to the start of the flowchart 202 in the synchronized state.

In some embodiments a terminal in cold start mode can optionally transmit data in case it is in the footprint of a receive capable satellite. In warm start mode 250 (not shown) the terminal calculates expanded possible pass windows and wakes up during these, and if this fails the terminal enters cold start mode.

The above flowchart can be varied, or implemented in various ways. For example in the receive path 222 the receive and update step assumes a satellite can be acquired (as the wake up is scheduled to enable this) and is shown as occurring before listening for a gateway beacon. However as gateways can also be used as a source of ephemeris, performance and capability data, attempting to acquire a satellite, and attempting to acquire a gateway beacon could be performed in parallel, and as soon as one is acquired the search for the other could be terminated and the ephemeris, performance and capability data obtained from the acquired source. Alternatively attempts to acquire satellites and gateways could be interleaved. If neither a satellite or a gateway can be acquired, the terminal may simply go to sleep until the next scheduled wake up time, when another attempt to acquire the ephemeris may be made. If there is not another scheduled wake up time then the terminal may estimate a wake up time based on the current ephemeris data. Further at step 230 the terminal could first transmit data to the satellite, and after transmitting data (step 232) then attempt to receive updated ephemeris data 240 from the satellite (if the satellite is capable of also transmitting ephemeris data) or a gateway beacon before going to sleep.

Figure 3:
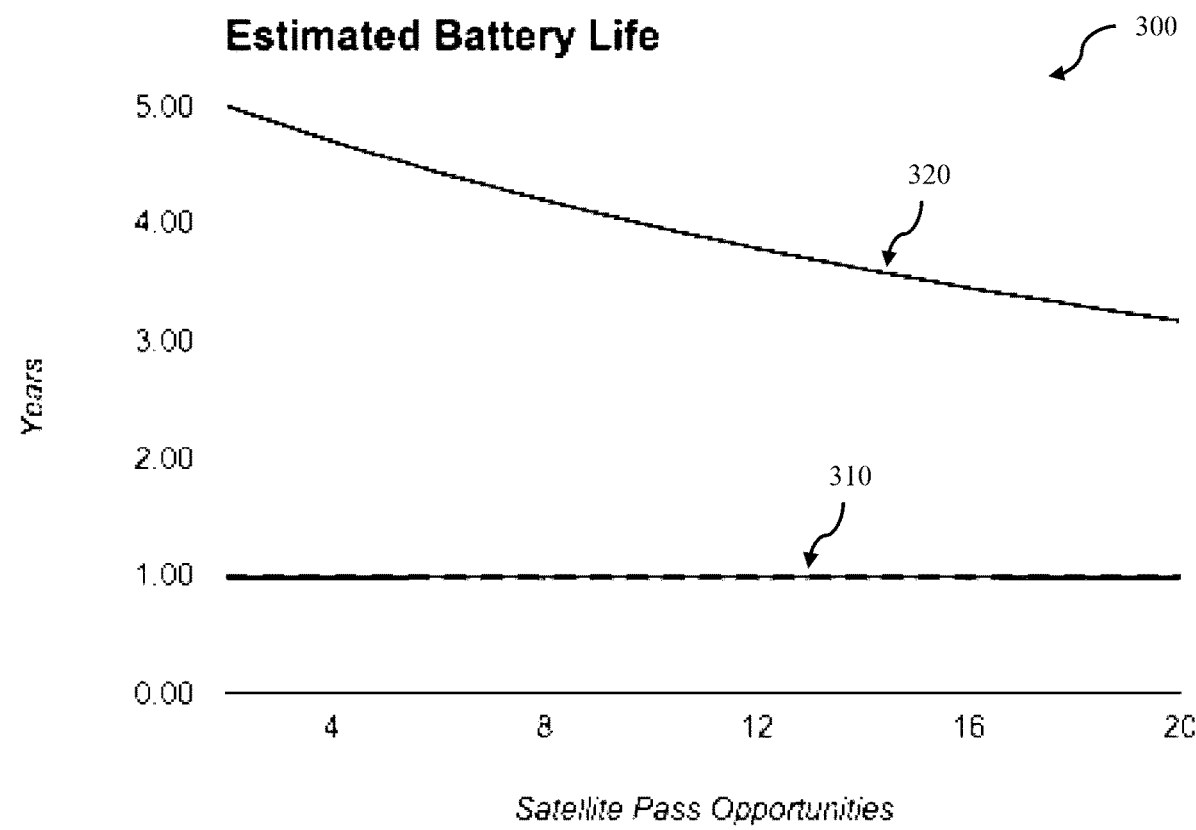
FIG. 3 is plot of the estimated battery life of terminals as a function of satellite pass opportunities in a communication system according to an embodiment.

FIG. 3 is plot 300 of the estimated battery life of terminals as a function of satellite pass opportunities in a communication system according to an embodiment. The vertical axis is predicted battery life (years), while the horizontal axis represents the number of receive satellite passes per day. Dashed line 310 shows the predicted battery life for a terminal operating in open loop mode in which a terminal wakes up periodically with a short period such that it is guaranteed at some point to communicate during a satellite pass (e.g., wake up for every 5 minutes in the case of a pass duration of 10 minutes). The solid line 320 illustrates the results using an embodiment of the scheduled method described herein which results in greatly increased battery life, e.g., almost 5 fold increase for the case of 4 satellite pass opportunities per day dropping to around 3 times for 20 satellite pass opportunities per day.

Figure 4:
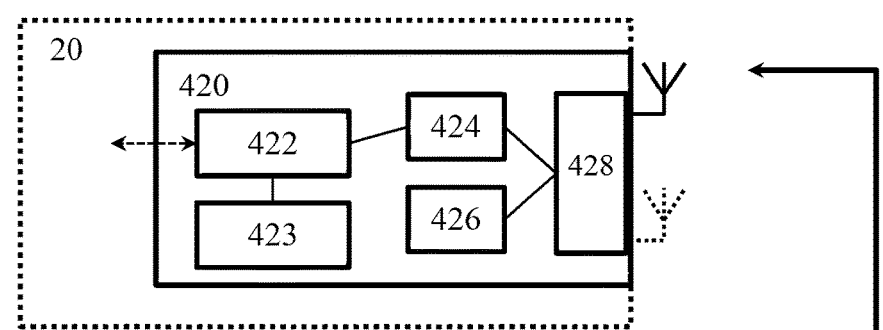
FIG. 4 is a schematic diagram of components of a communication system according to an embodiment.
Figure 4:
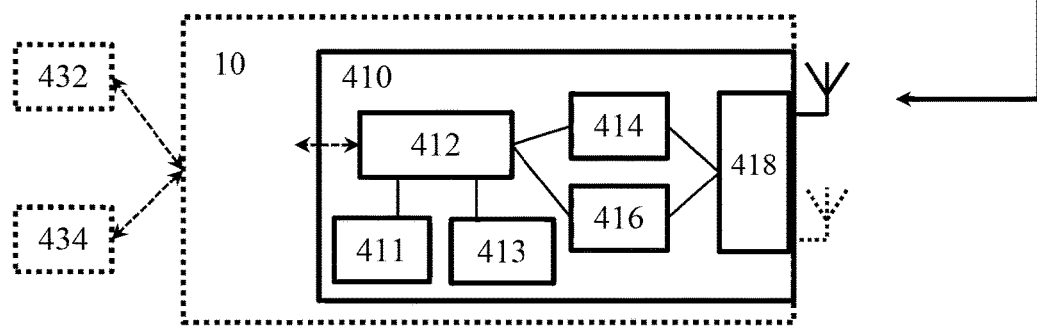

FIG. 4 is a schematic diagram of components of a communication system according to an embodiment. The satellite 20 comprises a communications module 420 such as a RF front end 428 with one or more antennas for communication with terminals and earth stations, a transmitter module 424 and receiver module 426 each of which may comprise encoding/decoding and modulation/demodulation components, a processor 422 and associated memory 423 for storing data (e.g., ephemeris, configuration and performance data), as well as controlling the operation of the satellite and transmission/reception of signals including decoding signals, generating acknowledgments, performing system optimization, and any other supporting operations.

A terminal 10 comprises a communications module 410 comprising a RF front end 28 and one or more antennas, a transmitter 414, a receiver 416 (which may be combined in a transceiver) and a processor 412 and associated memory 413 for controlling the operational state and mode of the terminal, and other requirements such as processing acknowledgement messages, selecting slots to use, performing system optimization and any other supporting operations. A position and timing module 411 provides position and global timing information to the processor 412. The terminals may be a standalone device with a communication means for transmitting and receiving data from an external sensor or device, a module or board for connecting to a sensor or device, or it may be integrated into an existing sensor or device 10, such as in the form of a communication chipset which stores protocols, data, code, instructions, etc. to enable the sensor or device to communicate via the system. The sensor or device 10 may connected to other sensors 432 or other devices 434.

The terminal further comprises an alarm module which is configured to wake up the terminal from the sleep state to a wake state at one or more scheduled wake up times. The terminal further comprises a scheduling module which is configured to schedule and provide the wake up times for the alarm module, and to put the terminal into the sleep state upon completion of terminal operations in the wake state. In this context terminal operations may be transmit or receive operations, configuration, or other operations relating to collecting or processing data, reporting terminal status, or system maintenance and configuring tasks.

The scheduling module is further configured to check the validity of ephemeris data on wakeup using the position and global time information. If the data is recently valid, then the scheduler is configured to estimate a set of possible satellite pass windows based on the stored ephemeris data and scheduling a set of warm wake up times during which the terminal is woken up to attempt to receive updated ephemeris data. If the ephemeris data is invalid then the terminal is scheduled to go to sleep and periodically wake up and attempt to receive updated ephemeris data with a period between wake up being less than an expected satellite pass duration (as detailed above). If the attempt to receive updated ephemeris data was unsuccessful then the terminal is configured to go back to sleep, and the terminal repeats operation until it successfully receives ephemeris data. Upon receiving updated ephemeris data, the ephemeris data is stored in the memory, and the scheduler schedules at least one wake up time based on the stored ephemeris data for transmitting data or for receiving updated ephemeris data and to put the terminals into a sleep state upon completion of one or more terminal operations whilst in the wake state.

The alarm module and scheduling module may be software modules, in which the instructions are stored in the memory and executed by the processor, hardware modules or a combination of the two. The alarm signals may be interrupt or wake up signal sent to a central controller or the scheduler which then triggers waking up of the terminal and subsequent wake up operations (e.g., position and time estimation). The alarm module may include a clock which is periodically synchronized to global time or it may monitor a clock in the position and timing module (or another clock in the terminal). The alarm module may store a single wake up time (i.e., the next wake up time), or it can store a set of wake up times. The scheduling module may comprise local memory for storage of the schedule or it may use the terminal memory 413. The schedule times may be stored as an array or table or other data structure in memory. The scheduling module may be configured to directly control power or wakefulness states to other modules or components, or it may communicate with a central controller by sending requests to the controller for the terminal to enter a sleep state once any pending tasks are completed, or at a particular time.

In some embodiments the satellites are orbital satellites which orbit the earth above the atmosphere (for example low earth orbit or LEO satellites). In some embodiments some of the satellites in the constellation are atmospheric satellites or pseudo satellites such as high altitude unmanned aerial vehicles (UAVs), such as solar and/or battery powered drones or airships capable of remaining in the air for extended periods (e.g., multiple days). Such atmospheric satellites could fly regular flight paths over the earth allowing generation of scheduling or ephemeris data. In the context of this specification the term satellite will refer to orbital satellites including LEO satellites, as well as atmospheric satellites or pseudo satellites (e.g., UAVs) with moving field of views.

The methods and system provide described provide improved methods for scheduling terminal operations. The terminal avoids unnecessary wake ups and can results in considerable power savings compared to other systems. This is particularly important in cases where these terminals are deployed in remote areas where battery replacement is expensive or impossible.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Aspects of the system may be a computer implemented using a computing device or apparatus which comprises one or more processors and a memory, and optionally input devices (e.g., keyboard, mouse, etc.) and output devices (e.g., a display) or connections may be provided to allow input and outputs when required. In some embodiments, no input or output connectors are provided or sealed during normal use, and all interaction with the device is via wireless communications. These may be integrated in receiver and transmitter apparatus or be in communication with receiver and transmitter apparatus, for example to perform specialized calculations on behalf of the receiver and transmitter apparatus. The memory may comprise instructions to cause the processor to execute aspects or steps of a method described herein. The processor and memory may be included in a standard computing device, such as a server, desktop computer, a portable computing device such as a laptop computer or tablet, or they may be included in a customized device or system. The computing device may be a unitary computing or programmable device, or a distributed device comprising several components operatively (or functionally) connected via wired or wireless connections. The one or more processors may comprise a central processing unit (CPU) comprising an Input/Output Interface, an Arithmetic and Logic Unit (ALU) and a Control Unit and Program Counter element which is in communication with input and output devices through the Input/Output Interface. The Input/Output Interface may comprise a network interface and/or communications module for communicating with an equivalent communications module in another device using a predefined communications protocol (e.g., Bluetooth, Zigbee, IEEE 802.15, IEEE 802.11, TCP/IP, UDP, etc.). A graphical processing unit (GPU) may also be included. The display apparatus may comprise a flat screen display (e.g., LCD, LED, plasma, touch screen, etc.), a projector, CRT, etc. The computing device may comprise a single CPU (core) or multiple CPU's (multiple core), or multiple processors. The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules or instructions. The processor(s) may be configured to load and executed the software modules or instructions stored in the memory.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A method of operation of a terminal in a satellite communication system comprising:
    a) receiving and storing, by the terminal, ephemeris data including validity data;
    b) scheduling at least one wake up time based on the stored ephemeris data for transmitting data or for receiving updated ephemeris data, wherein the terminal enters a sleep state between scheduled wakeup times and is woken up at a scheduled wake up time;
    c) waking up the terminal at a scheduled wake up time and performing the following actions before going back to sleep:
    d) obtaining an estimate of the terminal's position and the global time;
    e) determining, based upon the terminal's position and global time estimate, if the stored ephemeris data is valid, recently valid or invalid;
    f) if the stored ephemeris data is valid then either transmitting data to a satellite or attempting to receive updated ephemeris data from a satellite;
    g) if the stored ephemeris data is recently valid, then estimating a set of possible satellite pass windows based on the stored ephemeris data and scheduling a set of warm wake up times based on the estimation during which the terminal is woken up to attempt to receive updated ephemeris data;
    h) if the ephemeris data is invalid then the terminal is scheduled to go to sleep and periodically wake up and attempt to receive updated ephemeris data with a period between wake up being less than an expected satellite pass duration, and if the attempt to receive updated ephemeris data was unsuccessful then the terminal goes back to sleep, and the terminal repeats this action h) until it successfully receives ephemeris data;
    i) wherein upon receiving updated ephemeris data in action f), g) or h), the ephemeris data is stored and action b) is repeated.

2. The method as claimed in claim 1, wherein attempting to receive updated ephemeris data comprises the terminal listening for a maximum attempt duration time period t unless it successfully receives ephemeris data whilst listening.

3. The method as claimed in claim 2, wherein attempting to receive updated ephemeris data comprises a series of repeated attempts up to a predetermined maximum number of times n unless it successfully receives ephemeris data whilst listening, wherein it pauses between each attempt.

4. The method as claimed in claim 1, wherein scheduling at least one wake up time includes scheduling a plurality of wake up times, and at least one of the wake up times is a wakeup time to refine future wake up times, and comprises the terminal recalculating future scheduled wake up times based on the current estimate of the terminal's position and the global time.

5. The method as claimed in claim 1, wherein the terminal monitors one or more of a Satellite Telemetry, Tracking, and Command/Control (TT&C) channel, or satellite beacon, or a gateway beacon, and if a TT&C channel, or satellite beacon, or a gateway beacon is detected the terminal is woken up to perform actions d) to i) before going back to sleep.

6. The method as claim in claim 5, wherein the terminal passively monitors for one or more of the TT&C channel, satellite beacon, or a gateway beacon.

7. The method as claimed in claim 1, wherein in action i), after updated ephemeris data is received, the terminal listens for a gateway beacon, and if a gateway beacon is detected the terminal listens and receives a gateway position and stores the gateway position in a database of gateways.

8. The method as claimed in claim 1, wherein in actions f), g) or h), the terminal monitors for the presence of a gateway beacon before attempting to receive updated ephemeris data from a satellite, and if a gateway beacon is detected the terminal listens and receives a gateway position and stores the gateway position in a database of gateways, and receives the updated ephemeris data from the gateway beacon.

9. The method as claimed in claim 1, wherein in action f) or i) the terminal performs time interleaved monitoring for either a satellite or a gateway beacon, and receives updated ephemeris data from whichever of the satellite and gateway to first be detected.

10. The method as claimed in claim 1, wherein the terminal is configured to receive performance data and/or capability data in addition to ephemeris data from a satellite or a gateway beacon, and this data is used to determine when to schedule a wake up time for transmitting data.

11. The method as claimed in claim 1, wherein in action h), the terminal transmits data when awake.

12. The method as claimed in claim 1, wherein the ephemeris data is valid for a first predefined time period, recently valid for a second predefined time period after the first predefined time period, and invalid after the second predefined time period, and determining if the stored ephemeris data is valid, recently valid or invalid is based on the estimate of the global time obtained in action d).

13. The method as claimed in claim 1, wherein determining if the stored ephemeris data is valid, recently valid or invalid is based on an accuracy profile and an accuracy threshold for recently valid and an accuracy threshold for invalid.

14. The method as claimed in claim 1, wherein when ephemeris data is received that is more recent than the stored ephemeris data, and the at least one wake up time comprises at least one future wake up time, the terminal recalculates the at least one future wake up time based upon the received ephemeris data and the current estimate of the terminal's position and the global time obtained in action d).

15. A terminal apparatus in a satellite communication system comprising:
   a receiver apparatus;
   a transmitting apparatus;
   a position and timing module;
   a processor, and
   a memory, wherein the memory comprises instructions to configure the processor to:
   a) receive and store ephemeris data including validity data received using the receiver apparatus;
   b) schedule at least one wake up time based on the stored ephemeris data for transmitting data or for receiving updated ephemeris data, wherein the terminal enters a sleep state between scheduled wakeup times and is woken up at a scheduled wake up time;
   c) wake up the terminal at a scheduled wake up time and perform the following actions before going back to sleep:
   d) obtaining an estimate of the terminal's position and the global time from the position and timing module;
   e) determining, based upon the terminal's position and global time estimate, if the stored ephemeris data is valid, recently valid or invalid;
   f) if the stored ephemeris data is valid then either transmitting data to a satellite using the transmitting apparatus or attempting to receive updated ephemeris data from a satellite using the receiver apparatus;
   g) if the stored ephemeris data is recently valid, then estimating a set of possible satellite pass windows based on the stored ephemeris data and scheduling a set of warm wake up times based on the estimation during which the terminal is woken up to attempt to receive updated ephemeris data using the receiver apparatus;
   h) if the ephemeris data is invalid then the terminal is scheduled to go to sleep and periodically wake up and attempt to receive updated ephemeris data using the receiver apparatus with a period between wake up being less than an expected satellite pass duration, and if the attempt to receive updated ephemeris data was unsuccessful then the terminal goes back to sleep, and the terminal repeats this action h) until it successfully receives ephemeris data;
   i) wherein upon receiving updated ephemeris data in action f), g) or h), the ephemeris data is stored and action b) is repeated.

16. The terminal apparatus as claimed in claim 15, wherein scheduling at least one wake up time includes scheduling a plurality of wake up times, and at least one of the wake up times is a wakeup time to refine future wake up times, and comprises the terminal recalculating future scheduled wake up times based on the current estimate of the terminal's position and the global time.

17. The terminal apparatus as claimed in claim 15, wherein in action f) or i) the terminal performs time interleaved monitoring for either a satellite or a gateway beacon, and receives updated ephemeris data from whichever of the satellite and gateway to first be detected.

18. The terminal apparatus as claimed in claim 15, wherein the terminal is configured to receive performance data and/or capability data in addition to ephemeris data from a satellite or a gateway beacon, and this data is used to determine when to schedule a wake up time for transmitting data.

19. The terminal apparatus as claimed in claim 15, wherein determining if the stored ephemeris data is valid, recently valid or invalid is based on an accuracy profile and an accuracy threshold for recently valid and an accuracy threshold for invalid.

20. The terminal apparatus as claimed in claim 15, wherein when ephemeris data is received that is more recent than the stored ephemeris data, and the at least one wake up time comprises at least one future wake up time, the terminal recalculates the at least one future wake up time based upon the received ephemeris data and the current estimate of the terminal's position and the global time obtained in action d).

21. A satellite communication system comprising a plurality of terminal apparatuses, and a plurality of satellites, wherein one or more of the satellites are configured to transmit ephemeris data for the plurality of satellites to the plurality of terminal apparatuses, wherein each of the terminal apparatuses comprises:
   a receiver apparatus;
   a transmitting apparatus;
   a position and timing module;
   a processor, and
   a memory, wherein the memory comprises instructions to configure the processor to:
   a) receive and store ephemeris data including validity data received using the receiver apparatus;
   b) schedule at least one wake up time based on the stored ephemeris data for transmitting data or for receiving updated ephemeris data, wherein the terminal enters a sleep state between scheduled wakeup times and is woken up at a scheduled wake up time;
   c) wake up the terminal at a scheduled wake up time and perform the following actions before going back to sleep:
   d) obtaining an estimate of the terminal's position and the global time from the position and timing module;
   e) determining, based upon the terminal's position and global time estimate, if the stored ephemeris data is valid, recently valid or invalid;
   f) if the stored ephemeris data is valid then either transmitting data to a satellite using the transmitting apparatus or attempting to receive updated ephemeris data from a satellite using the receiver apparatus;
   g) if the stored ephemeris data is recently valid, then estimating a set of possible satellite pass windows based on the stored ephemeris data and scheduling a set of warm wake up times based on the estimation during which the terminal is woken up to attempt to receive updated ephemeris data using the receiver apparatus;
   h) if the ephemeris data is invalid then the terminal is scheduled to go to sleep and periodically wake up and attempt to receive updated ephemeris data using the receiver apparatus with a period between wake up being less than an expected satellite pass duration, and if the attempt to receive updated ephemeris data was unsuccessful then the terminal goes back to sleep, and the terminal repeats this action h) until it successfully receives ephemeris data;
   i) wherein upon receiving updated ephemeris data in action f), g) or h), the ephemeris data is stored and action b) is repeated.

22. A terminal apparatus in a satellite communication comprising:
   a receiver apparatus configured to receive ephemeris data transmitted by one or more satellites or a gateway in the satellite communication system, and configured to receive a beacon transmission from a gateway;

a transmitting apparatus configured to transmit data to one or more satellites or a gateway in the satellite communication system;

a position and timing module configured to estimate the terminal's position and the global time;

a memory for storing the received ephemeris data;

an alarm module configured to wake up the terminal apparatus from the sleep state to a wake state at one or more scheduled wake up times, and a scheduling module configured to schedule at least one wake up time based on the stored ephemeris data for transmitting data or for receiving updated ephemeris data, and to put the terminals into a sleep state upon completion of one or more terminal operations whilst in the wake state;

and wherein upon wake up the scheduling module request the terminal's position and global time from the position and timing module, and is configured to determine, based upon the terminal's position and global time estimate, if the stored ephemeris data is valid, recently valid or invalid, and if the ephemeris data is valid, then the terminal is configured to either transmit data to a satellite or attempting to receive updated ephemeris data from a satellite, and if the stored ephemeris data is recently valid, then the scheduler is configured to estimate a set of possible satellite pass windows based on the stored ephemeris data and scheduling a set of warm wake up times based on the estimation during which the terminal is woken up to attempt to receive updated ephemeris data, and if the ephemeris data is invalid then the terminal is scheduled to go to sleep and periodically wake up and attempt to receive updated ephemeris data with a period between wake up being less than an expected satellite pass duration, and if the attempt to receive updated ephemeris data was unsuccessful then the terminal is configured to go back to sleep, and the terminal repeats operation until it successfully receives ephemeris data, and upon receiving updated ephemeris data, the ephemeris data is stored in the memory, and the scheduler schedules at least one wake up time based on the stored ephemeris data for transmitting data or for receiving updated ephemeris data and to put the terminal into a sleep state upon completion of one or more terminal operations whilst in the wake state.

* * * * *